(12) United States Patent
Miki

(10) Patent No.: US 7,295,390 B2
(45) Date of Patent: Nov. 13, 2007

(54) LENS ACTUATING DEVICE, CAMERA MODULE AND PORTABLE ELECTRONIC EQUIPMENT

(75) Inventor: Renzaburo Miki, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/292,224

(22) Filed: Nov. 30, 2005

(65) Prior Publication Data

US 2006/0114583 A1 Jun. 1, 2006

(30) Foreign Application Priority Data

Nov. 30, 2004 (JP) ............................. 2004-345652

(51) Int. Cl.
*G02B 7/02* (2006.01)
(52) U.S. Cl. .................. 359/824; 359/694; 359/696; 359/695; 359/819; 359/822; 359/823; 359/825; 359/826
(58) Field of Classification Search ................ 359/829, 359/694, 696, 695, 819, 822–826
See application file for complete search history.

(56) References Cited

U.S. PATENT DOCUMENTS

| 4,621,283 | A | * | 11/1986 | Feinbloom | 348/77 |
| 5,027,147 | A | * | 6/1991 | Kaneda | 396/81 |
| 5,150,260 | A | * | 9/1992 | Chigira | 359/694 |
| 5,177,638 | A | * | 1/1993 | Emura et al. | 359/704 |
| 5,225,941 | A | * | 7/1993 | Saito et al. | 359/824 |
| 5,323,199 | A | * | 6/1994 | Yoshida | 396/87 |
| 5,363,248 | A | * | 11/1994 | Horio | 359/704 |
| 5,748,394 | A | * | 5/1998 | Shimazaki et al. | 359/823 |
| 5,854,711 | A | * | 12/1998 | Kaneda | 359/697 |
| 5,900,995 | A | * | 5/1999 | Akada et al. | 359/824 |
| 6,501,604 | B2 | * | 12/2002 | Onda | 359/696 |
| 2005/0168847 | A1 | * | 8/2005 | Sasaki | 359/823 |

FOREIGN PATENT DOCUMENTS

| JP | 08-292358 | 11/1996 |
| JP | 9-32902 | 2/1997 |
| JP | 2003-262907 | 9/2003 |

\* cited by examiner

*Primary Examiner*—Scott J. Sugarman
*Assistant Examiner*—James R Greece
(74) *Attorney, Agent, or Firm*—David G. Conlin; Steven M. Jensen; Edwards Angell Palmer & Dodge LLP

(57) ABSTRACT

Power from a focusing motor (14) is transmitted via a gear (35*a*) to a focusing lead screw (15) so that a first lens holder (4) is moved in a direction of an optical axis. Power from a zooming motor (10) is transmitted via a gear (35*b*) to a zooming lead screw (11) so that a second lens holder (8) is moved in the direction of the optical axis. The first and second lens holders (4, 8), the focusing and zooming lead screws (15, 11), the focusing and zooming motors (14, 10), and the gears (35*a*, 35*b*) are contained in a housing (30, 31). The focusing motor (14) and the zooming motor (10) may be fixed to a gear case (30).

16 Claims, 10 Drawing Sheets

LENS ACTUATING DEVICE, CAMERA MODULE AND PORTABLE ELECTRONIC EQUIPMENT

This nonprovisional application claims priority under 35 U.S.C. §119(a) on Patent Application No. 2004-345652 filed in Japan on Nov. 30, 2004, the entire contents of which are hereby incorporated by reference.

BACKGROUND ART

The present invention relates to a lens actuating device, a camera module, and portable electronic equipment and particularly relates to a lens actuating device in which a zooming motor for actuating a zoom lens and a focusing motor for actuating a focusing lens are coaxially disposed, and a camera module and portable electronic equipment in which the lens actuating device is used.

In an imaging apparatus such as video camera and video movie for taking pictures of a subject, generally, a zoom lens for adjusting a perspective of an image of the subject and a focusing lens for adjusting a focus of the image of the subject are provided, and the image of the subject that is to be captured is formed on an imaging device such as CCD.

Among conventional lens actuating devices is a lens actuating device which actuates a zoom lens and a focusing lens in directions of an optical axis. In the lens actuating device for the zoom lens and the focusing lens, a zooming motor and a focusing motor are fixed to first and second different motor mounts, respectively, so that an increased number of components including resin bearings are required, which deteriorates workability in assembling. Besides, the lens actuating device has a problem in that the first and second motor mounts disposed in different directions involve poor utilization of mounting space.

A lens actuating device improved with regard to such problems has been proposed in JP 3410250 B2. In the lens actuating device, as shown in FIG. 6, an imaging lens 102 is fixed on subject side, and a first lens holding frame 104 holding a zoom lens 103 is placed behind the imaging lens 102. The first lens holding frame 104 is guided by upper and lower guide shafts 105, 106 so as to be capable of reciprocating along an optical axis K in directions of arrows X1, X2. On the other hand, a second lens holding frame 108 holding a focusing lens 107 is placed on imaging device side behind the zoom lens 103. The second lens holding frame 108 is guided by the upper and lower guide shafts 105, 106 so as to be capable of reciprocating along the optical axis K in the directions of the arrows X1, X2. Upper end part 104a of the first lens holding frame 104 holding the zoom lens 103 is pinched by a halfnut member 109 in which a halfnut part 109a and a pressing part 109b are integrally formed. Upper end part 108a of the second lens holding frame 108 holding the focusing lens 107 is pinched by a halfnut member 113 in which a halfnut part 113a and a pressing part 113b are integrally formed.

In the vicinity of the upper end part 104a of the first lens holding frame 104 and the upper end part 108a of the second lens holding frame 108 is a motor mount 121. The motor mount 121 is formed of a sheet metal member bent into a shape of a square bracket. A zooming motor 110 is fixed to one lateral side part 121a of the motor mount 121, and a focusing motor 114 is fixed to the other lateral side part 121b facing the one lateral side part 121a of the motor mount 121 across a space. At an intermediate position between the one lateral side part 121a and the other lateral side part 121b of the motor mount 121, bearing hold part 121c for holding a resin bearing 122 is formed integrally with a base part 121d by cutting and bending a part of the base part 121d. The lateral side parts 121a, 121b and the bearing hold part 121c are bent at generally right angles with respect to the base part 121d.

In the lens actuating device 120 configured in such a manner, the zooming motor 110 for actuating the zoom lens 103 and the focusing motor 114 for actuating the focusing lens 7 are fixed to the single motor mount 121, and a first lead screw 111 of the zooming motor 110 and a second lead screw 115 of the focusing motor 114 are supported by a bearing part (121c, 122) formed at an intermediate position of the motor mount 121 such that the screws can be rotated coaxially and independently. Therefore, the lens actuating device 120 has advantages including not only decrease in number of components and improvement in workability in assembling but also improvement in utilization of mounting space for the motors 110, 114 and reduction in size of the lens actuating device 120, in comparison with conventional devices.

In recent years, small camera modules that make use of solid-state image sensors such as CCD have begun being installed in many types of portable equipment. Such camera modules are required to have drop resistance that prevents destruction of the module in event of drop of the portable equipment, which drop may be caused by a mistake of a user. For example, it is generally said that a drop impact acceleration caused on portable equipment dropped from a height of 1.7 m onto a concrete block is on the order of 6000 G. When an impact caused by the drop or the like of the portable equipment is exerted on the lens actuating device 120 employed in a camera module, moments about the bearing part (121c, 122) formed at the intermediate position of the motor mount 121 are produced on the zooming motor 110 directly connected to the first lead screw 111 and on the focusing motor 114 directly connected to the second lead screw 115. In a camera module for portable equipment, generally, a motor mount is often made of resin instead of metal, in view of weight reduction. Such a resin motor mount has a decreased strength and causes a problem in that the lens actuating device tends to be destructed under influence of the moments.

SUMMARY OF THE INVENTION

An object of the present invention is to provide a lens actuating device having a high drop impact resistance and a camera module using the same.

Another object of the invention is to provide portable electronic equipment using such camera module and having high reliability.

In order to accomplish the above object, a lens actuating device according to an aspect of the present invention comprises a first lens holder for holding a first lens; a first lead screw that engages with the first lens holder and that moves the first lens holder in directions of an optical axis; a second lens holder for holding a second lens; a second lead screw that engages with the second lens holder and that moves the second lens holder in the directions of the optical axis; a first motor for rotating the first lead screw; a first gear for transmitting power from the first motor to the first lead screw; a second motor for rotating the second lead screw; a second gear for transmitting power from the second motor to the second lead screw; and a housing in which the first and second lens holders, the first and second lead screws, the first and second motors, and the first and second gears are contained.

In accordance with the lens actuating device having the above configuration, there is no direct connection between the first motor and the first lead screw and between the second motor and the second lead screw in the housing, which arrangement makes a moment smaller and increases strength against impact. Thus, drop impact resistance is improved.

The first motor and the second motor may be fixed to the housing.

The fixation of the first motor and the second motor to the housing makes the motors themselves, supported by the housing, rigid members (members having rigidity), and thus the strength is further increased in comparison with other arrangement.

The first lead screw and the second lead screw may be disposed coaxially and parallel to the direction of the optical axis and rotatably supported by the housing.

In accordance with this configuration, a projected area in the direction of the optical axis of the device is decreased and size reduction is achieved.

A side of the first lead screw at which the first gear engages the first lead screw and a side of the second lead screw at which the second gear engages the second lead screw may preferably be away from each other.

If the sides engaged with the first and second gears of the first and second lead screws are close to each other, namely, are located near a center between the first and second lead screws disposed coaxially, the side of the first lead screw engaged with the first gear interferes with the first lens holder and the side of the second lead screw engaged with the second gear interferes with the second lens holder. As a result, a range in which the first and second lens holders reciprocate in the directions of the optical axis areas is restricted, and it is impossible to ensure sufficient lengths of bearing parts with respect to a guide shaft for the first and second lens holders in the direction of the optical axis.

In the arrangement in which the side of the first lead screw engaged with the first gear is spaced apart from the side of the second lead screw engaged with the second gear, by contrast, the interference between the side of the first lead screw engaged with the first gear and the first lens holder is prevented when the first lens holder moves along the direction of the optical axis, and the interference between the side of the second lead screw engaged with the second gear and the second lens holder is also prevented when the second lens holder moves along the direction of the optical axis. Thus the range in which the first and second lens holders reciprocate in the directions of the optical axis is enlarged, and lengths of bearing parts with respect to a guide shaft for the first and second lens holders in the direction of the optical axis can be increased. Consequently, the first and second lens holders can be reciprocated stably and smoothly.

The first motor and the second motor may be placed in a direction orthogonal to axes of the first and second screws and on lateral sides of the first and second lead screws so that the axes of the first and second lead screws and output shafts of the first and second motors are made generally parallel and coaxial.

When the output shafts of the first motor and the second motor are made coaxial and generally parallel to the axes of the first and second lead screws, the projected area in the direction of the optical axis can be decreased. In addition, when the first motor and the second motor are placed in the direction orthogonal to the axes of the first and second lead screws and on the lateral sides of the first and second lead screws (to be more precise, in positions corresponding to the lateral sides of the first and second lead screws), so that the length in the direction of the optical axis can be decreased and that the projected area in the direction orthogonal to the direction of the optical axis can be decreased. As a result, the reduction in size of the lens actuating device can be achieved.

In this case, an output shaft side of the first motor and an output shaft side of the second motor are, preferably, away from each other.

In this configuration, centers of gravity of the first and second motors can be made to considerably near each other, in comparison with a configuration in which the output shaft side of the first motor and the output shaft side of the second motor are close to each other. Thus, it is possible to reduce influence of a moment that is produced by exertion of a drop impact force on the whole lens actuating device.

In one embodiment, the first lens holder and the second lens holder have guide bearing parts that are slidably guided on a guide shaft parallel to the optical axis, and one of the guide bearing parts of the first lens holder and the second lens holder is provided with a protruding part that protrudes toward the other of the guide bearing parts, and the other of the guide bearing parts of the first lens holder and the second lens holder is provided with a recessed part that avoids interference with the protruding part.

In the lens actuating device of the embodiment, the guide bearing part of the first lens holder is slidably guided on the guide shaft in accordance with rotation of the first lead screw, and thus the first lens holder moves in the direction of the optical axis along an axial direction of the guide shaft. The guide bearing part of the second lens holder is slidably guided on the guide shaft in accordance with rotation of the second lead screw, and thus the second lens holder moves in the direction of the optical axis along the axial direction of the guide shaft. Sliding parts of the guide bearing parts of the first and second lens holders that are guided along one guide shaft in this manner preferably have as large lengths as possible in the direction of the guide shaft so that the first and second lens holders are not inclined relative to the optical axis when sliding. Increase in the lengths of the guide bearing parts of the first and second lens holders, however, results in interference between the guide bearing parts when the first and second lens holders near each other. In accordance with the above lens actuating device, by contrast, interference between the guide bearing parts can be avoided when the first and second lens holders near each other, and moving ranges of the first and second lens holders can be enlarged, because one of the guide bearing parts of the first and second lens holders is provided with the protruding part that protrudes toward the other of the guide bearing parts, while the other of the guide bearing parts of the first and second lens holders is provided with the recessed part that avoids interference with the protruding part.

The camera module according to the present invention employs the above lens actuating device.

In accordance with the camera module having the above configuration, shock resistance is improved and high reliability is achieved by use of the lens actuating device having great resistance to drop impact.

The camera module may have a bent optical system of which an optical axis is bent by 90 degrees by an optical path converting element.

By the provision of the bent optical system having the optical axis bent by 90 degrees by the optical path converting element, the camera module can be placed in equipment with an orientation of the camera module toward a subject set in a direction of thickness of the equipment, and effective use of inner space can be made, especially in equipment having a thin shape.

Portable electronic equipment according to the present invention uses the camera module described above.

With use of the camera module having high shock resistance in portable electronic equipment that is likely to be frequently subjected to drop impact, reliable portable electronic equipment with camera function is achievable.

In one embodiment, the portable electronic equipment includes the camera module having a bent optical system of which an optical axis is bent by 90 degrees by an optical path converting element, and a casing for housing the camera module. And, the camera module is placed in the casing such that a longitudinal direction of the camera module coincides with a direction generally perpendicular to a longitudinal direction of the casing and that orientation of the camera module toward a subject coincides with a direction of thickness of the casing.

In this embodiment, the direction to the subject in shooting can be made orthogonal to a surface of a main monitor of a mobile phone, for example, and thus sense of incongruity in shooting can be reduced.

BRIEF DESCRIPTION OF THE DRAWINGS

The present invention will become more fully understood from the detailed description given hereinbelow and the accompanying drawings which are given by way of illustration only, and thus are not intended to limit the present invention, and wherein.

DETAILED DESCRIPTION OF THE INVENTION

A lens actuating device, a camera module, and portable electronic equipment in accordance with the present invention will be described in detail below with reference to embodiments shown in the accompanying drawings.

FIRST EMBODIMENT

Figure 1:
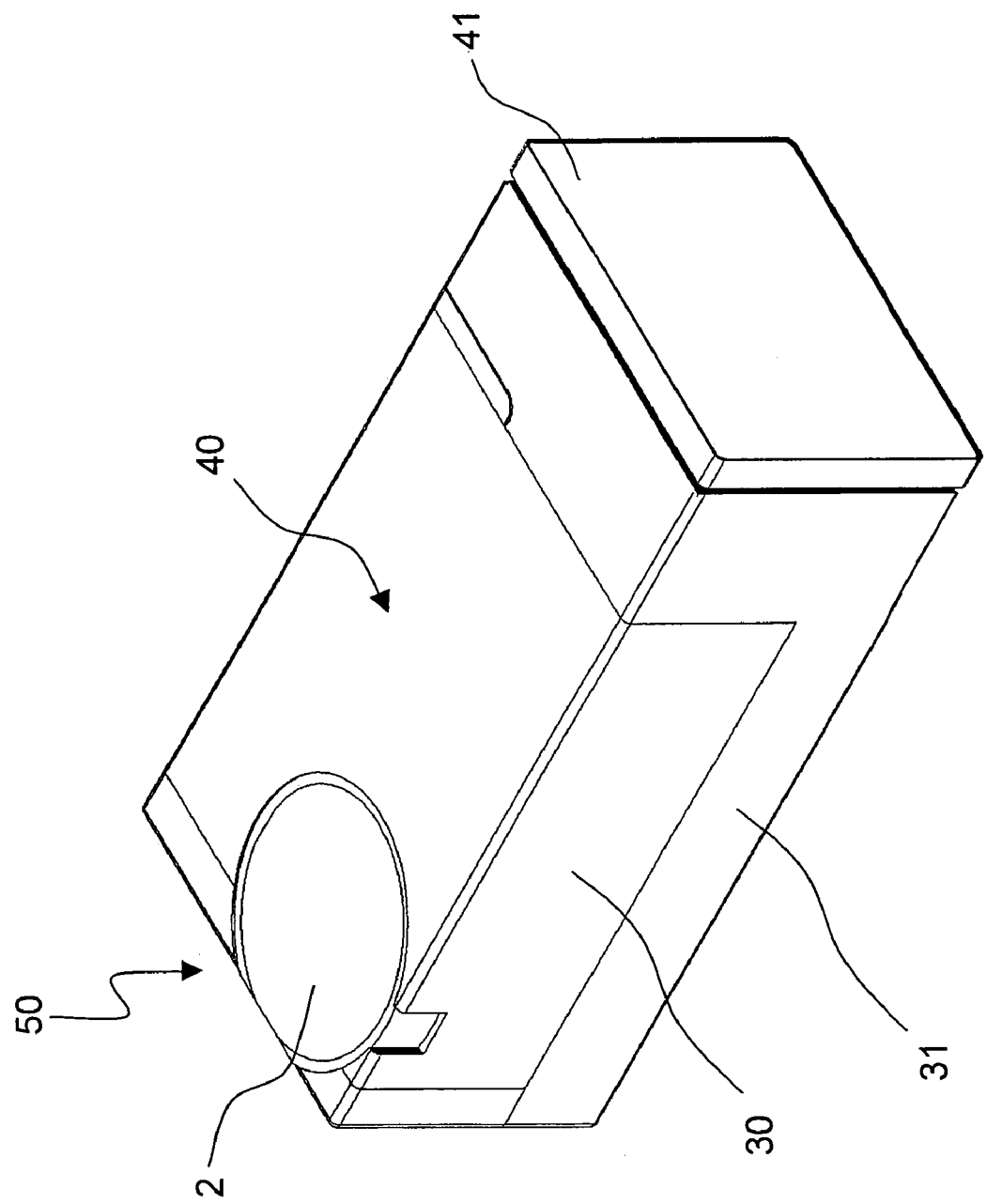
FIG. 1 is a perspective view of a camera module using a lens actuating device in accordance with an embodiment of the invention.

FIG. 1 shows a perspective view of a camera module in which a lens actuating device for actuating a zoom lens and a focusing lens in accordance with a first embodiment of the invention is installed.

As shown in FIG. 1, the camera module 50 has a gear case 30 having an imaging lens 2, an optical base 31 that is combined with the gear case 30 so as to constitute a housing for the lens actuating device 40, and an imaging device 41 fixed to the optical base 31. The gear case 30 and the optical base 31 are formed of resin having a rigidity.

Figure 2:
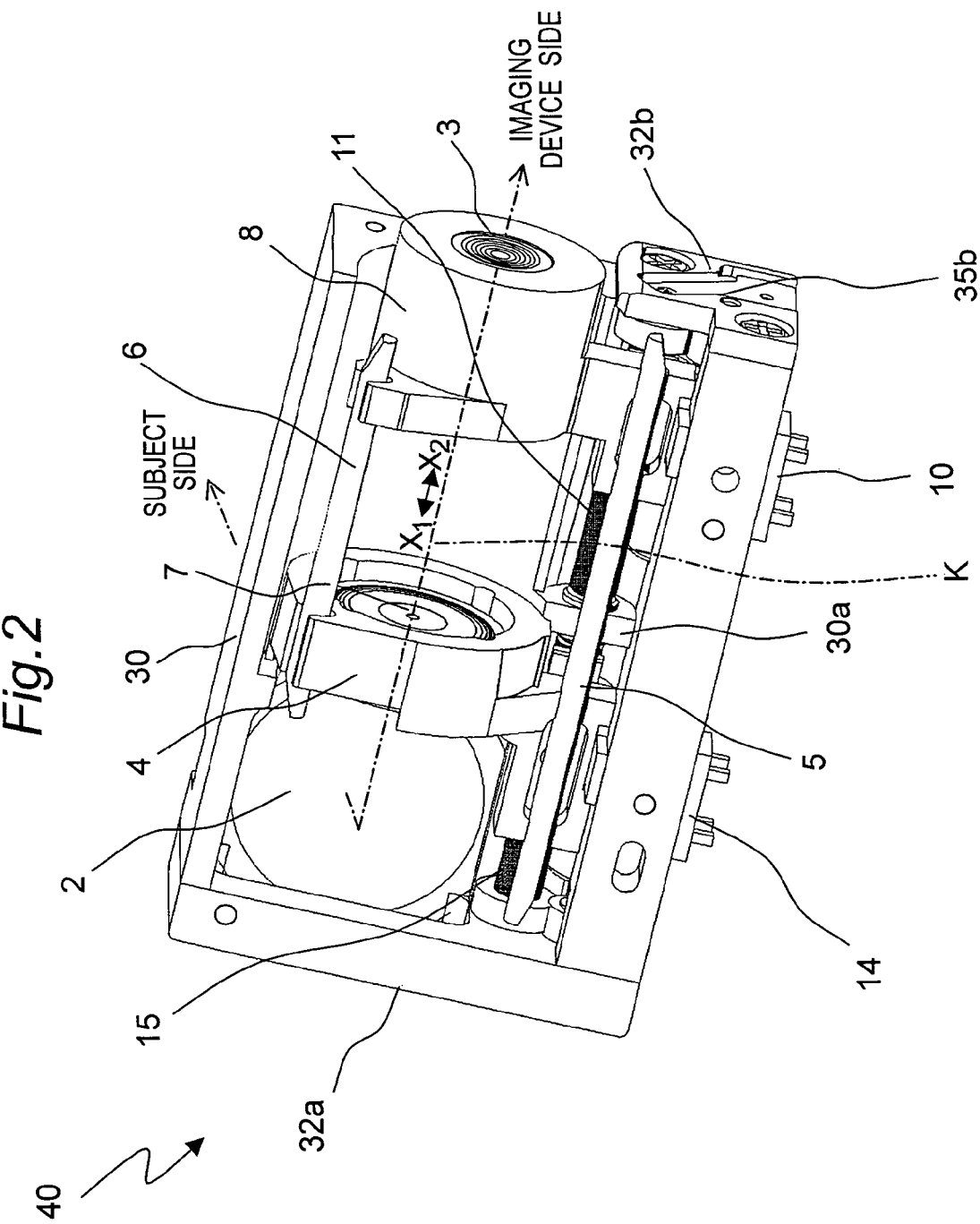
FIG. 2 is a perspective view of main parts of the camera module.

FIG. 2 shows a perspective view of a side of the gear case 30 in the lens actuating device 40 from which the optical base 31 (shown in FIG. 1) has been detached.

In an optical system of the camera module 50 in which the lens actuating device of the invention is installed, as shown in FIG. 2, incident rays of light that have passed through the imaging lens 2 fixed on the subject side are thereafter bent by 90 degrees by an optical path converting element (not shown) behind the imaging lens 2, unlike conventional lens actuating devices, pass through a focusing lens 7 as an example of the first lens and then a zoom lens 3 as an example of the second lens, and enter the imaging device 41 (shown in FIG. 1).

A first lens holder 4 holding the focusing lens 7 is guided by upper and lower guide shafts 5, 6 so as to be capable of reciprocating along an optical axis K in directions of arrows $X_1$, $X_2$. A second lens holder 8 holding the zoom lens 3 is placed on the side of the imaging device 41 (shown in FIG. 1) behind the focusing lens 7 and is guided by the upper and lower guide shafts 5, 6 so as to be capable of reciprocating along the optical axis K in the directions of the arrows $X_1$, $X_2$.

Figure 3:
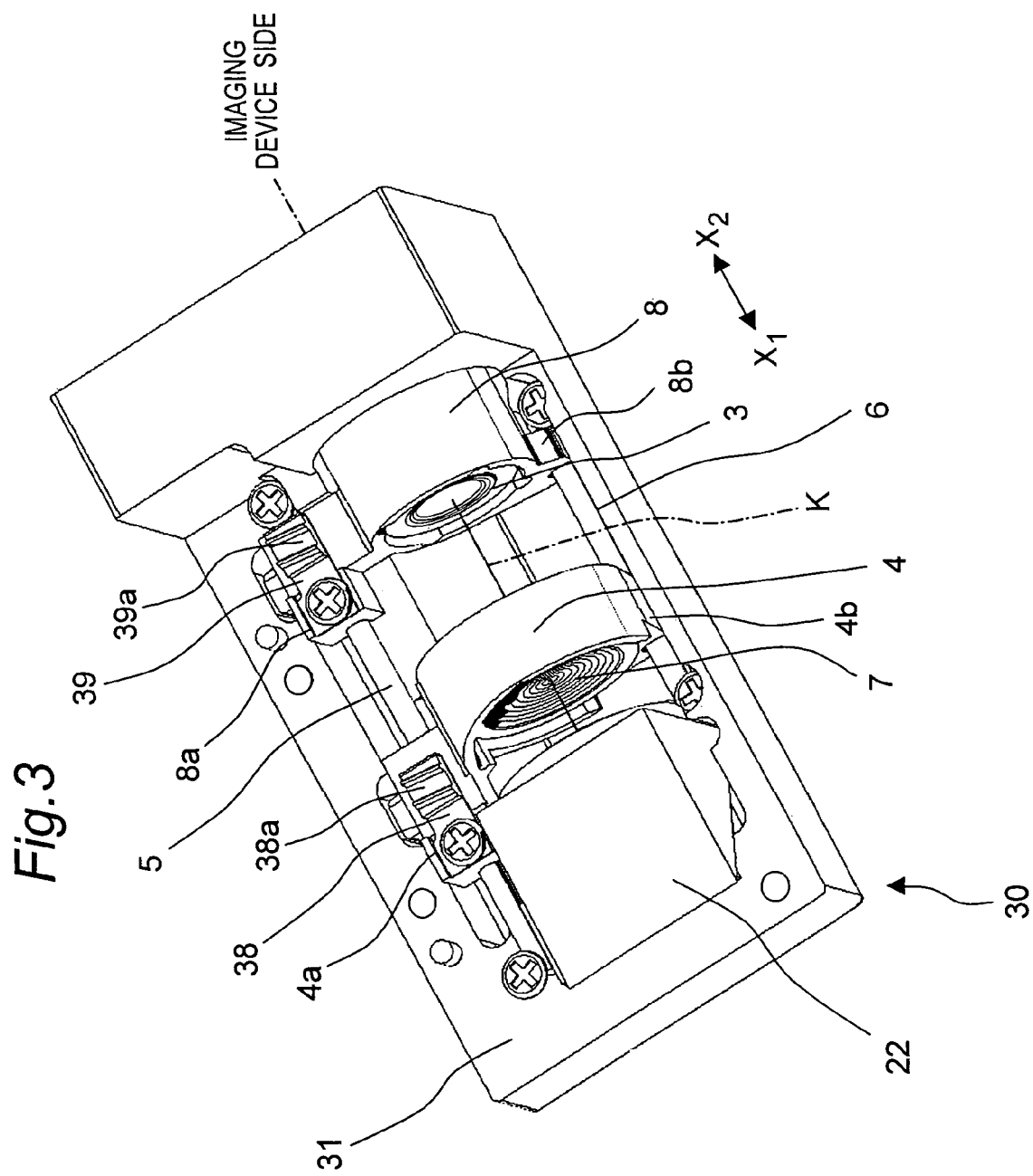
FIG. 3 is a perspective view of main parts of the camera module.

FIG. 3 shows a perspective view of a side of the optical base 31 in the lens actuating device 40 from which the gear case 30 (shown in FIG. 1) has been detached.

As shown in FIG. 3, both ends of the guide shaft 5 and of the guide shaft 6 are fixed to the optical base 31. On the optical base 31 are mounted the optical path converting element 22 and a second imaging lens (not shown), which are fixed lenses, and the focusing lens 7 and the zoom lens 3, which are movable lenses. The focusing lens 7 and the zoom lens 3 are held by the first lens holder 4 and the second lens holder 8, respectively, and mounted so as to be slidable in the directions of the arrow $X_1$ and the arrow $X_2$ relative to the guide shaft 5 and the guide shaft 6 that are fixed to the optical base 31.

The first lens holder 4 and the second lens holder 8 have guide bearing parts 4a, 8a that are slidably guided along the guide shaft 5. The first lens holder 4 and the second lens holder 8 also have guide parts 4b, 8b that are slidably guided along the guide shaft 6. A leaf spring 38 with rack is fixed to the guide bearing part 4a of the first lens holder 4. The leaf spring 38 has a rack part 38a that is provided so as to face a focusing lead screw 15 (shown in FIG. 2) as an example of the first lead screw of the lens actuating device 40. A leaf spring 39 with rack is fixed to the guide bearing part 8a of the second lens holder 8. The leaf spring 39 has a rack part 39a that is provided so as to face a zooming lead screw 11 (shown in FIG. 2) as an example of the second lead screw of the lens actuating device 40.

Figure 4:
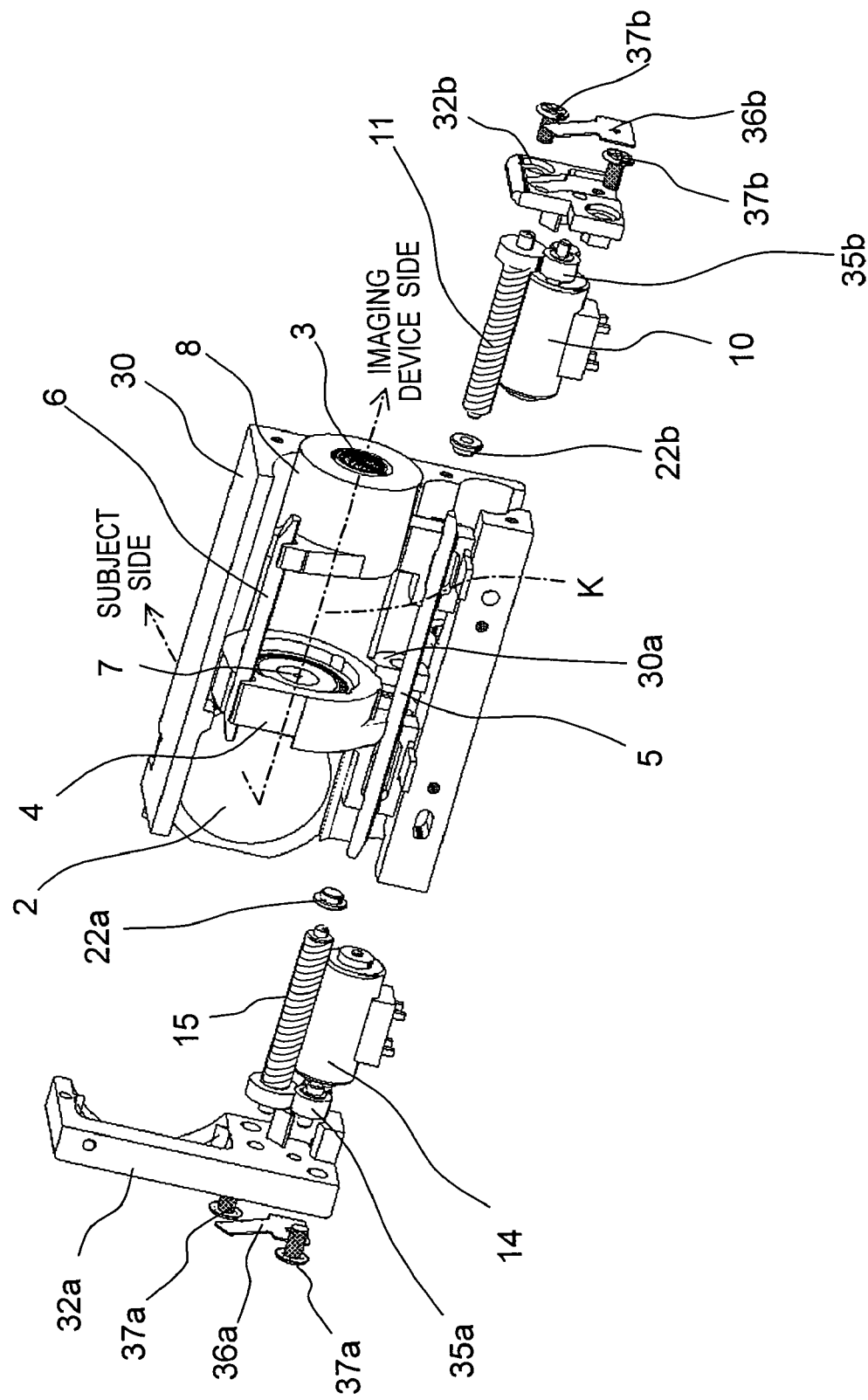
FIG. 4 is an exploded perspective view of the lens actuating device.

FIG. 4 shows an exploded perspective view of the lens actuating device 40. As shown in FIG. 4, a focusing motor 14 as an example of the first motor, the focusing lead screw 15, a focusing transmission gear 35a as an example of the first gear for transmitting power of the focusing motor 14 to the focusing lead screw 15, and a focusing-lead-screw bearing 22a for rotatably supporting the focusing lead screw 15 at one end thereof are inserted into the gear case 30 along the optical axis K from outside. The focusing-lead-screw bearing 22a is fixed to bearing fixation part 30a provided in the gear case 30. The focusing motor 14, the focusing lead screw 15, the focusing transmission gear 35a, and the focusing-lead-screw bearing 22a constitute a focusing actuator.

A zooming motor 10 as an example of the second motor, the zooming lead screw 11, a zooming transmission gear 35b as an example of the second gear for transmitting power of the zooming motor 10 to the zooming lead screw 11, and a zooming-lead-screw bearing 22b for rotatably supporting the zooming lead screw 11 one end thereof are inserted into the gear case 30 along the optical axis K from outside. The zooming-lead-screw bearing 22b is fixed to the bearing fixation part 30a provided in the gear case 30. The zooming motor 10, the zooming lead screw 11, the zooming transmission gear 35b, and the zooming-lead-screw bearing 22b constitute a zooming actuator.

The focusing actuator is held between the gear case 30 and a cover 32a for the focusing actuator and is fixed by screws 37a. Displacement of the focusing lead screw 15 in thrust directions is restricted by a focusing-lead-screw pressurization spring 36a. The zooming actuator is held between the gear case 30 and a cover 32b for the zooming actuator and is fixed by screws 37b. Displacement of the focusing lead screw 15 in thrust directions is restricted by a zooming-lead-screw pressurization spring 36b.

The above arrangement decreases moments that would be produced by exertion of drop impact forces on the motors 10, 14 because there are no direct connections between the zooming motor 10 and the zooming lead screw 11 and between the focusing motor 14 and the focusing lead screw 15. Besides, the motors 10, 14 held between the gear case 30 and the covers 32a, 32b make themselves rigid members and thus increase strength of the actuating mechanism 40. Moreover, the focusing motor 14 and the zooming motor 10 that are disposed coaxially, the focusing lead screw 15 and the zooming lead screw 11 that are disposed coaxially, and the focusing transmission gear 35a and the zooming transmission gear 35b that are disposed coaxially are independently disposed along the optical axis K.

In this manner, the parts corresponding to the focusing actuator and the parts corresponding to the zooming actuator are mounted on different but parallel axes. Accordingly, a projected area of the lens actuating device 40 in the direction of the optical axis is decreased and reduction in size of the lens actuating device 40 is thereby made possible. Besides, centers of gravity of the motors 10, 14 can be set in the vicinity of a center of the gear case 30, and influence of a moment that is produced by exertion of a drop impact force on the whole lens actuating device 40 can be reduced.

Figure 5:
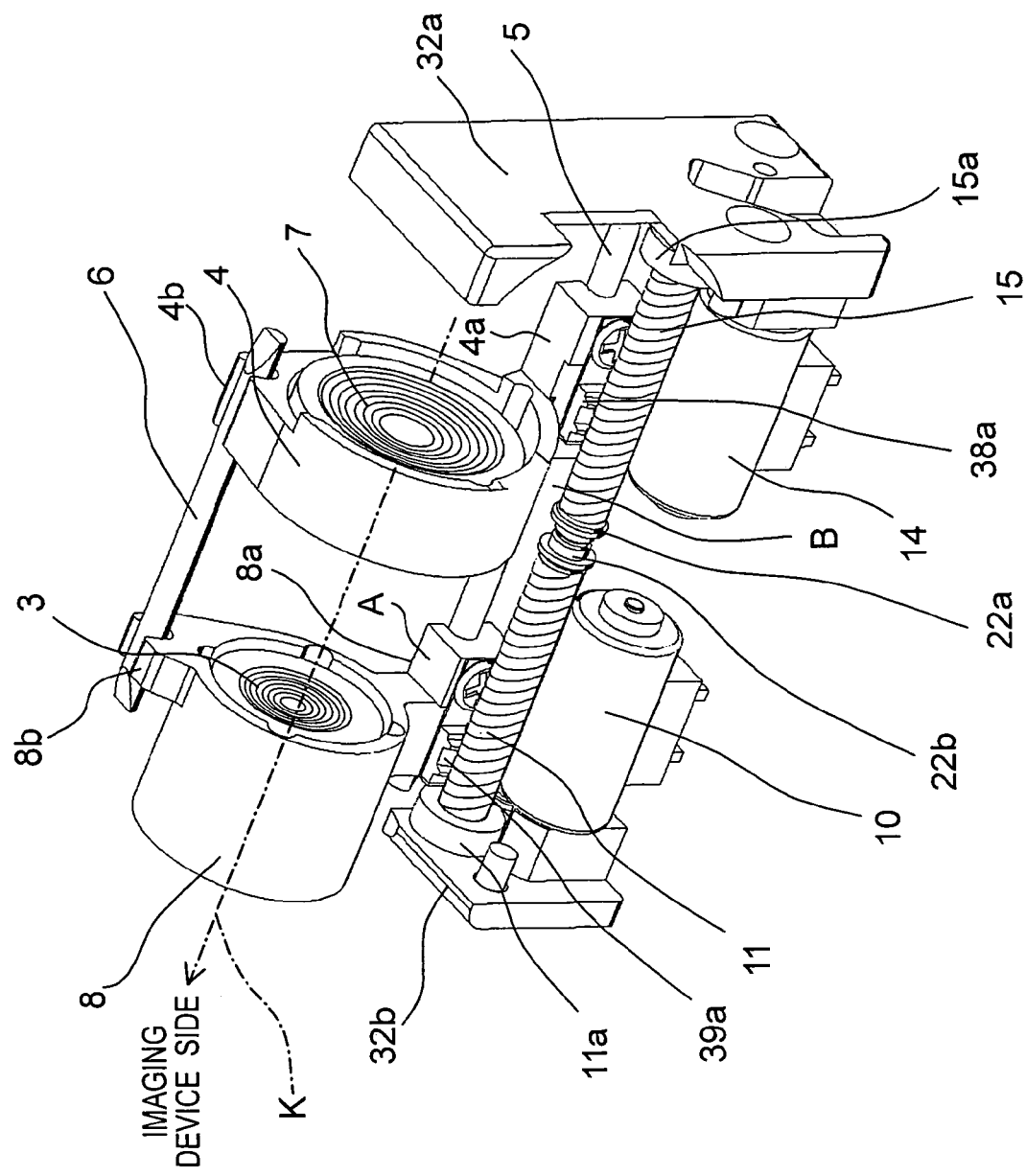
FIG. 5 is a perspective view of the lens actuating device as seen looking from a different viewpoint.
Figure 6:
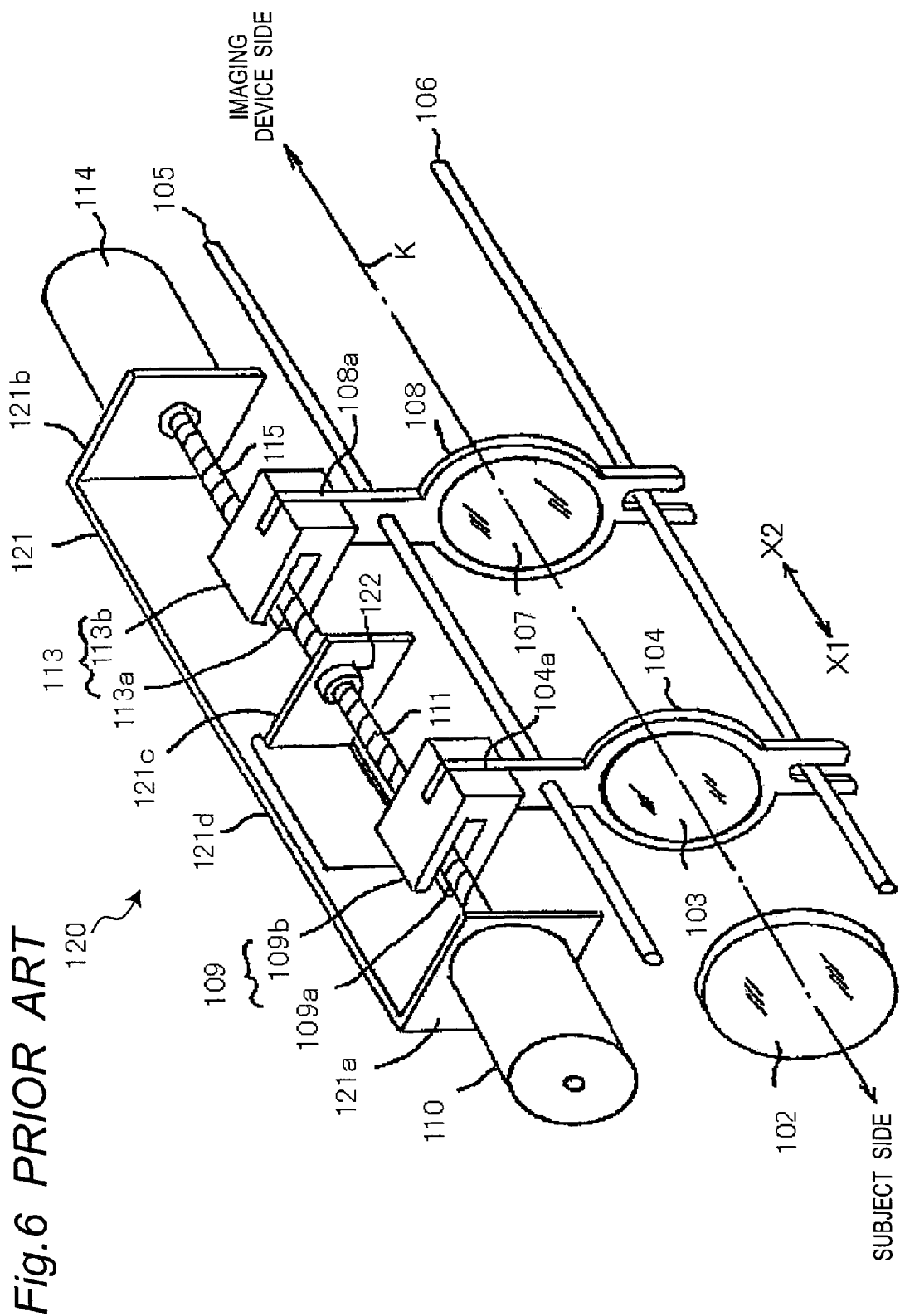
FIG. 6 is a perspective view showing a conventional lens actuating device.

FIG. 5 shows a perspective view of the lens actuating device 40 of the invention as viewed from a direction different from that in FIG. 2. In FIG. 5, the gear case 30 is not shown for the sake of clarity.

As shown in FIG. 5, the focusing transmission gear 35a (shown in FIG. 4) for transmitting power from the focusing motor 14 to the focusing lead screw 15 engages with a focusing lead screw gear 15a positioned at one end of the focusing lead screw 15. The zooming transmission gear 35b (shown in FIG. 4) for transmitting power from the zooming motor 10 to the zooming lead screw 11 engages with a zooming lead screw gear 11a positioned at one end of the zooming lead screw 11. The focusing lead screw 15 and the zooming lead screw 11 are coaxially mounted so that the focusing lead screw gear 15a is farthest from the zooming lead screw gear 11a, and vice versa.

Required strokes in the direction of the optical axis differ between the zooming lens 3 and the focusing lens 7, and the required stroke of the zooming lens 3 is larger than that of the focusing lens 7. In accordance with the configuration described above, interference of the zooming lead screw gear 11a with the second lens holder 8 can be prevented when the second lens holder 8 moves in the direction of the optical axis. As a result, a length of the bearing part of the second lens holder 8 relative to the guide shaft 5 in the direction of the optical axis can be increased and the second lens holder 8 can be reciprocated stably and smoothly.

Activation of the focusing motor 14 reciprocates the first lens holder 4 along the optical axis K through action of the focusing lead screw 15 and the rack part 38a provided on the first lens holder 4 holding the focusing lens 7. Activation of the zooming motor 10 reciprocates the second lens holder 8 along the optical axis K, independently of the first lens holder 4, through action of the zooming lead screw 11 and the rack part 39a provided on the second lens holder 8 holding the zoom lens 3. A perspective of an image of a subject is adjusted by the reciprocation of the zoom lens 3, and a focus of the image of the subject is adjusted by the reciprocation of the focusing lens 7.

The rack part 38a and the rack part 39a resiliently engage with the focusing lead screw 15 and the zooming lead screw 11, respectively. Upon drop impact, this arrangement allows the rack parts to disengage from rows of teeth of the focusing lead screw 15 and the zooming lead screw 11 and thus prevents fracture such as chipped gear teeth.

In accordance with the lens actuating device having the above configuration, there are no direct connections between the focusing motor 14 and the focusing lead screw 15 and between the zooming motor 10 and the zooming lead screw 11 and this arrangement allows decrease in moment and increase in strength against impact. Thus, drop resistance is improved.

Besides, the strength is further increased because the focusing motor 14 and the zooming motor 10 are fixed to the gear case 30 of the housing so that the motors themselves are thus made rigid members.

The focusing lead screw 15 and the zooming lead screw 11 that are rotatably supported by the gear case 30 of the housing are disposed coaxially and parallel to the direction of the optical axis. Accordingly, the projected area in the direction of the optical axis can be decreased and the reduction in size can be achieved.

Also, the focusing lead screw gear 15a for the focusing lead screw 15 and the zooming lead screw gear 11a for the zooming lead screw 11 are away from each other. Accordingly, interference of the focusing lead screw 15 with the first lens holder 4 is prevented when the first lens holder 4 moves in the direction of the optical axis and interference of the zooming lead screw 11 with the second lens holder 8 is also prevented. As a result, a range in which the first and second lens holders 4, 8 reciprocate in the directions of the optical axis can be enlarged, and lengths of the guide bearing parts 4a, 8a of the first and second lens holders 4, 8 in the direction of the optical axis can be increased, so that the first and second lens holders 4, 8 are allowed to be reciprocated stably and smoothly.

Output shafts of the focusing motor 14 and the zooming motor 10 are made coaxial and generally parallel to axes of the focusing lead screw 15 and the zooming lead screw 11, so that the projected area in the direction of the optical axis can be decreased. The focusing motor 14 and the zooming motor 10 are placed on lateral sides of the focusing lead screw 15 and the zooming lead screw 11 and to a direction orthogonal to axes of the screws, so that the projected area in the direction orthogonal to the direction of the optical axis can be decreased. As a result, the reduction in size of the lens actuating device can be achieved.

The output shaft side of the focusing motor 14 and the output shaft side of the zooming motor 10 are spaced apart with the focusing motor 14 and the zooming motor 10 placed coaxially, so that centers of gravity of the focusing motor 14 and the zooming motor 10 can be set in the vicinity of the center of the gear case 30. Therefore, it is possible to reduce influence of a moment that is produced by exertion of a drop impact force on the whole lens actuating device.

A protrusion A (shown in FIG. 5) that protrudes toward the first lens holder 4 is provided on the guide bearing part 8*a* of the second lens holder 8, and a recess B (shown in FIG. 5) that does not interfere with the protrusion A is provided on the guide bearing part 4*a* of the first lens holder 4. Thus, interference between the guide bearing parts 4*a*, 8*a* is avoided when the first and second lens holders 4, 8 near each other. Consequently, moving ranges of the first and second lens holders 4, 8 can be enlarged.

A center point in the direction of the optical axis of the guide bearing part 4*a* of the first lens holder 4 is offset toward a direction away from the imaging device 41 with respect to a center point in the direction of the optical axis of a main body of the first lens holder 4. A center point in the direction of the optical axis of the guide bearing part 8*a* of the second lens holder 8 is also offset in a direction away from the imaging device 41 with respect to a center point in the direction of the optical axis of a main body of the first lens holder 8.

In accordance with the camera module having the above configuration, shock resistance can be improved and high reliability can be achieved by use of the lens actuating device having great resistance to drop impact.

Because the camera module has the bent optical system of which the optical axis is bent by 90 degrees by the optical path converting element 22, the camera module can be placed in the equipment with an orientation of the camera module toward a subject set in a direction of thickness of the equipment, so that effective use of space in the equipment can be made.

SECOND EMBODIMENT

A mobile phone as an example of portable electronic equipment in which a camera module is installed in accordance with of a second embodiment of the invention will be described with reference to FIGS. 7 through 10.

Figure 7:
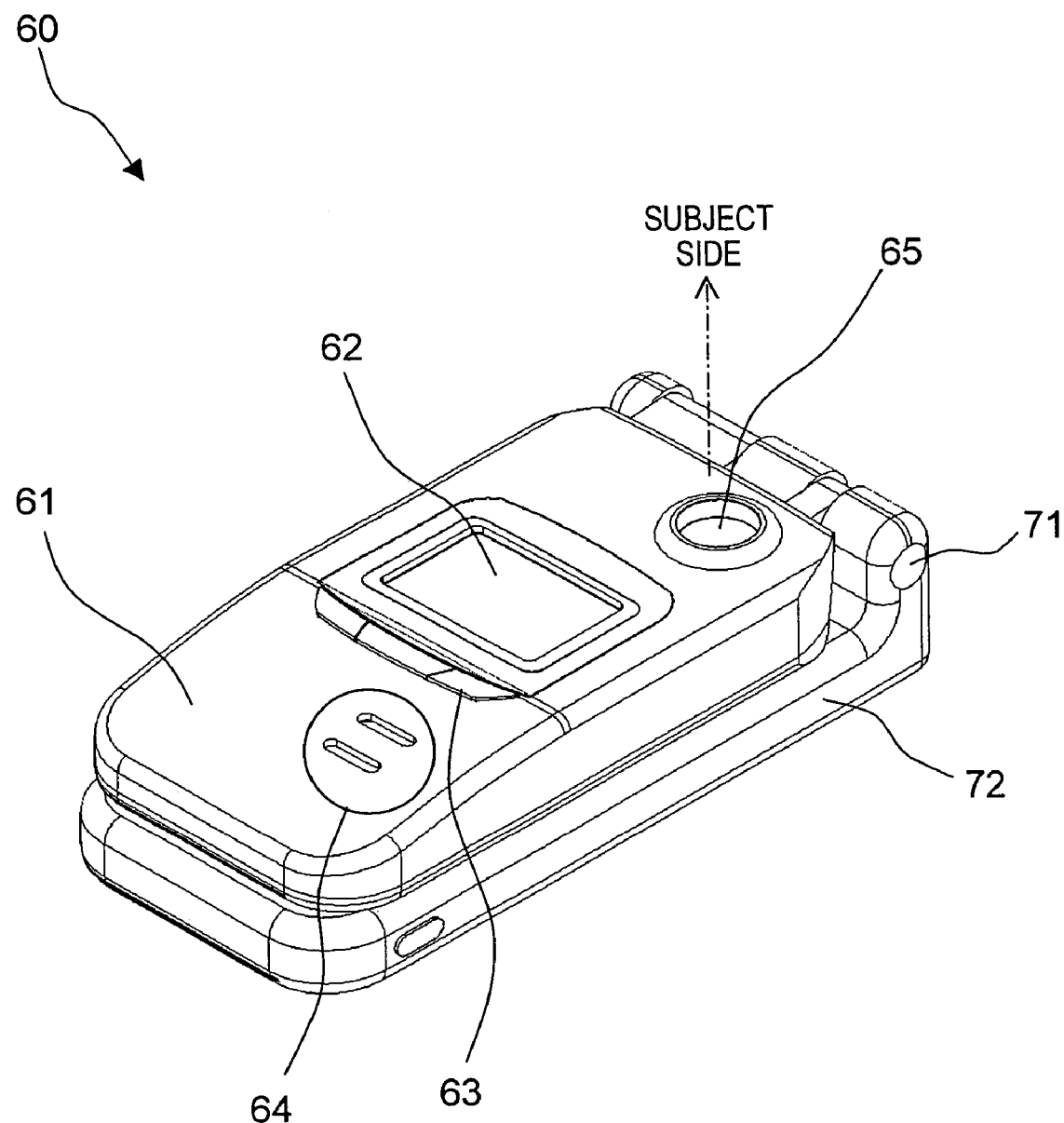
FIG. 7 is a perspective view of a mobile phone in which a camera module in accordance with a second embodiment of the invention is installed.

As shown in FIG. 7, the mobile phone 60 has a first casing 61 and a second casing 72 that are connected through a hinge 71. In the first casing 61, the camera module 50 (shown in FIG. 9) is installed in back of an imaging hole 65, and a sub-monitor 62 and sub-monitor operation buttons 63 are also installed. Speaker holes 64 are provided in the vicinity of the sub-monitor operation buttons 63, and a speaker 70 (shown in FIG. 9) is installed in back of the speaker holes 64. In the second casing 72 is installed a main circuit system (not shown) including operation buttons, a microphone, an antenna, a communication circuit, and memories. Thus, the second casing 72 has functions of communication, camera shooting, music player, and the like.

FIG. 8A shows a perspective view of an operation panel side of the mobile phone in the shooting mode in which the first casing 61 and the second casing 72 are opened, and FIG. 8B shows a perspective view of a side including the imaging hole 65 of the mobile phone in the shooting mode. In FIGS. 8A and 8B, the same components as those shown in FIG. 7 are designated by the same reference numerals.

As shown in FIG. 8A, a main monitor 66 and an earphone 67 are installed in the first casing 61, and an operation part with a plurality of operation buttons 73 is installed in the second casing 72.

The camera module 50 is installed in the first casing 61 in which the main monitor 66 is installed, because a configuration in which a direction to a subject in shooting, as shown in FIG. 8B, is orthogonal to a surface of the main monitor 66 shown in FIG. 8A causes little sense of incongruity, or of discomfort, in shooting and is therefore desirable to a shooter. Even if, however, the mobile phone employs a configuration in which the camera module is installed in the second casing, the sense of incongruity in shooting can be resolved by taking measures such as two-step hinge (what is called double hinge) by which the direction to a subject in shooting is made orthogonal to the surface of the main monitor 66 as described above.

Figure 9:
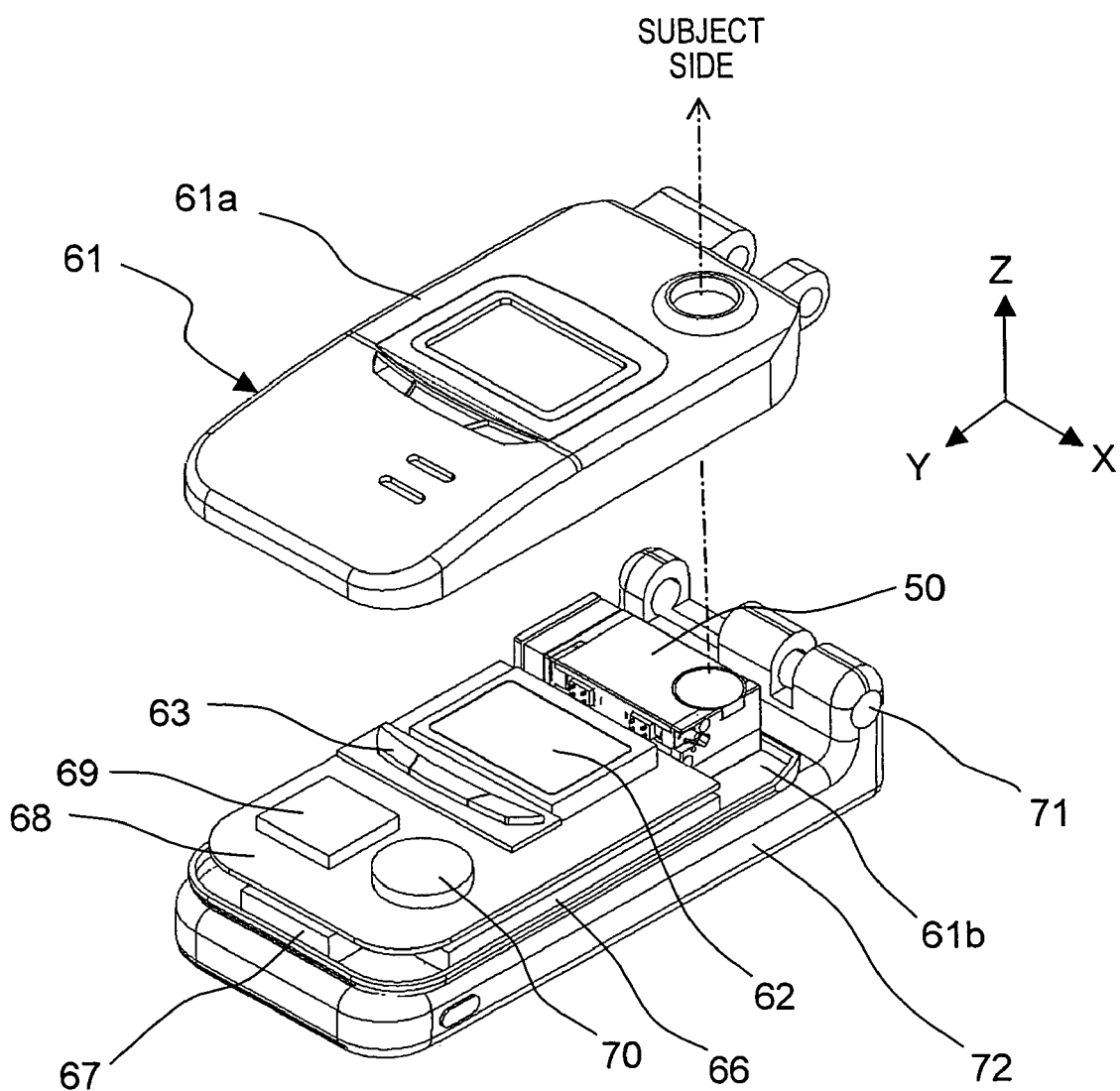
FIG. 9 is an exploded perspective view showing the camera module installed in the mobile phone.

In the mobile phone 60, as shown in an exploded perspective view of the first casing 61 of FIG. 9, the first casing 61 has an upper cover 61*a* and a lower cover 61*b*. Between the upper cover 61*a* and the lower cover 61*b* is placed a sub-circuit board 68 on which the main monitor 66, the sub-monitor 62, the sub-monitor operation buttons 63, sub-circuits 69, and the speaker 70 are installed. The sub-circuit board 68 occupies most of a volume in the first casing 61. The earphone 67 is placed beneath the sub-circuit board 68. In the vicinity of the hinge 71, there are arranged flexible boards (not shown) for connecting the first casing 61 and the second casing 72. The remaining space in the first casing 61, which can be occupied by the camera module 50, is therefore not so large, and it is difficult to place the camera module 50 such that its longitudinal direction coincides with a direction Y (which is a longitudinal direction of the first casing 61).

Accordingly, the camera module 50 is set such that its longitudinal direction coincides with a direction X (a direction perpendicular to the longitudinal direction of the first casing 61), as shown in FIG. 9. However, the size in the direction X of the mobile phone is also constrained from the viewpoint of preventing deterioration in handling ability of users of the phone, as a matter of course. The camera module, therefore, should be designed such that the projected area on X-Y plane of the module is small. In recent mobile phones, on the other hand, installation of a sub-monitor in addition to a main monitor has been getting ordinary. Because the main monitor 66 and the sub-monitor 62 are mounted on the sub-circuit board 68, the thickness of the mobile phone tends to increase. In the camera module 50, its projected area on the X-Y plane is reduced and the compensation for that reduction is reflected on a size of the camera module 50 in a direction Z, that is, in the direction of the thickness thereof, within a range allowed by a sum of thicknesses of the main monitor 66, the sub-monitor 62 and the sub-circuit board 68.

Figure 8:
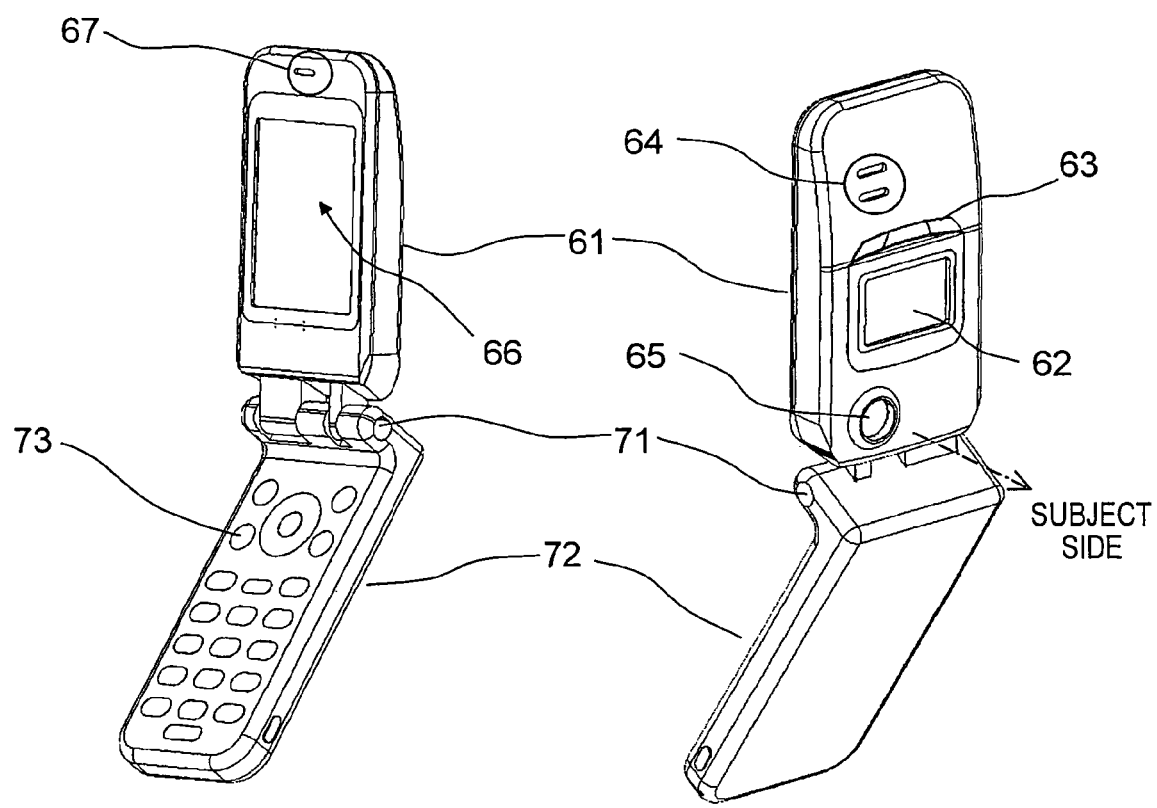
FIG. 8A is a perspective view showing an operation side of the mobile phone in shooting status in which a first casing and a second casing are opened.
FIG. 8B is a perspective view showing an imaging hole side of the mobile phone in the shooting status.
Figure 10:
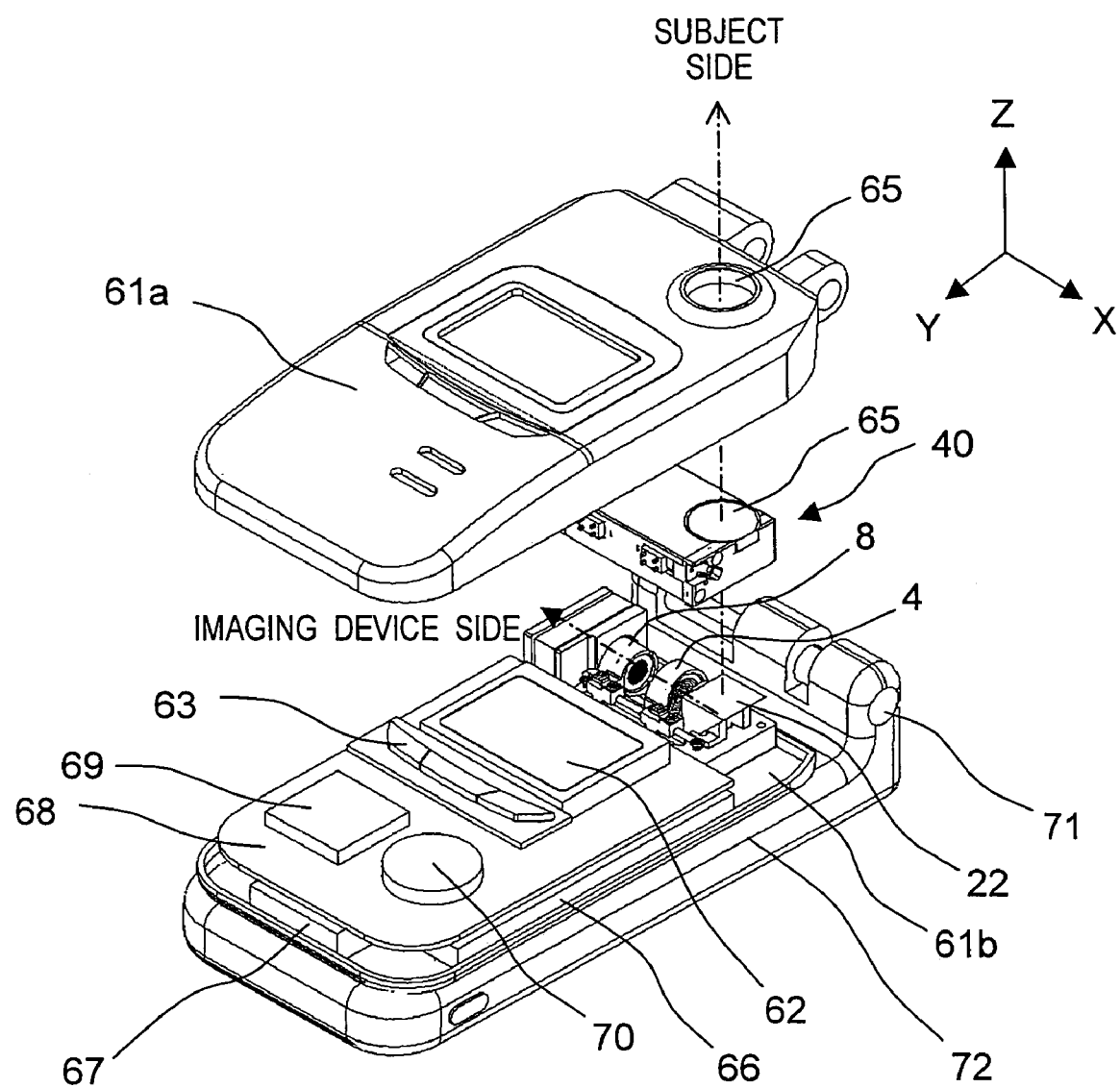
FIG. 10 is a perspective view in which the camera module shown in FIG. 9 has been disassembled.

FIG. 10 shows a perspective view of the mobile phone which is shown in FIG. 9 and in which the camera module 50 has been disassembled. In FIG. 10, the same components as those shown in FIGS. 8 and 9 are designated by the same reference numerals.

As shown in FIG. 10, the optical system of the lens actuating device in the camera module 50 is a bent optical system in which rays of light incident on the imaging hole 65 from the subject side are bent by 90 degrees toward the imaging device side by the optical path converting element 22, as distinct from conventional lens actuating devices, and are thereafter cast into the imaging device 41 through the focusing lens 7 and the zoom lens 3 that are held by the first and second lens holders 4, 8. With the bent optical system configuration, the direction to a subject in shooting can be made orthogonal to the surface of the main monitor 66 so that a shooter will have little sense of incongruity in shooting.

With respect to a camera module to which an optical system of a conventional lens actuating device is applied and which is installed in the same manner as shown in FIG. 10, a subject is positioned in the direction X, and the main monitor 66 is parallel to the shooting direction. For shooting, accordingly, an orientation and an angle of a first casing including the main monitor 66 have to be changed with use of expensive special hinges. Consequently, it may be impossible to quickly take the shooting position, and a shooting button may need to be provided separately in a direction different from that of the operation button 73 (shown in FIG. 8).

In the mobile phone 60 having the camera module in accordance with the second embodiment of the invention, by contrast, the arrangement by which the direction to a subject in shooting is made orthogonal to the surface of the main monitor 66 reduces the sense of incongruity or discomfort that a shooter may have in shooting, and significantly improves operability.

In accordance with the mobile phone 60 in which the camera module having a high shock resistance is used and which may frequently be subjected to drop impact, there is obtained a mobile phone with reliable camera function whose camera module is resistant to a drop impact acceleration caused by falling from a height of 1.7 m onto a concrete block.

With regard to the embodiments, the mobile phone having the camera module has been described as the portable electronic equipment. The portable electronic equipment, however, is not limited thereto, and the present invention is applicable to other portable electronic equipment such as PDA (Personal Digital Assistant).

Embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A lens actuating device comprising:
a first lens holder for holding a first lens, the first lens holder being guided by upper and lower guide shafts;
a first lead screw that engages with the first lens holder and that moves the first lens holder in directions of an optical axis;
a second lens holder for holding a second lens, the second lens holder being guided by the upper and lower guide shafts;
a second lead screw that engages with the second lens holder and that moves the second lens holder in the directions of the optical axis;
a first motor for rotating the first lead screw;
a first gear for transmitting power from the first motor to the first lead screw;
a second motor for rotating the second lead screw;
a second gear for transmitting power from the second motor to the second lead screw, the second gear being provided between an output shaft of the second motor and the second lead screw; and
a housing in which the first and second lens holders, the first and second lead screws, the first and second motors, and the first and second gears are contained.

2. The lens actuating device as set forth in claim 1, wherein the first motor and the second motor are fixed to the housing.

3. The lens actuating device as set forth in claim 1, wherein the first lead screw and the second lead screw are disposed coaxially and parallel to the direction of the optical axis and rotatably supported by the housing.

4. The lens actuating device as set forth in claim 3, wherein a side of the first lead screw at which the first gear engages the first lead screw and a side of the second lead screw at which the second gear engages the second lead screw are away from each other.

5. The lens actuating device as set forth in claim 3, wherein the first motor and the second motor are placed in a direction orthogonal to axes of the first and second screws and on lateral sides of the first and second lead screws so that the axes of the first and second lead screws and output shafts of the first and second motors are made generally parallel and coaxial.

6. The lens actuating device as set forth in claim 5, wherein an output shaft side of the first motor and an output shaft side of the second motor are away from each other.

7. The lens actuating device as set forth in claim 1,
wherein the first lens holder and the second lens holder have guide bearing parts that are slidably guided on a guide shaft parallel to the optical axis, and
wherein one of the guide bearing parts of the first lens holder and the second lens holder is provided with a protruding part that protrudes toward the other of the guide bearing parts, and the other of the guide bearing parts of the first lens holder and the second lens holder is provided with a recessed part that avoids interference with the protruding part.

8. A lens actuating device comprising:
a first lens holder for holding a first lens, the first lens holder being guided by upper and lower guide shafts;
a first lead screw that engages with the first lens holder and that moves the first lens holder in directions of an optical axis;
a second lens holder for holding a second lens, the second lens holder being guided by the upper and lower guide shafts;
a second lead screw that engages with the second lens holder and that moves the second lens holder in the directions of the optical axis;
a first motor for rotating the first lead screw;
a first gear for transmitting power from the first motor to the first lead screw;
a second motor for rotating the second lead screw;
a second gear for transmitting power from the second motor to the second lead screw, the second gear being provided between an output shaft of the second motor and the second lead screw; and
a housing in which the first and second lens holders, the first and second lead screws, the first and second motors, and the first and second gears are contained,
wherein the first lens holder and the second lens holder have guide bearing parts that are slidably guided on the upper and lower guide shafts parallel to the optical axis, and wherein one of the guide bearing parts of the first lens holder and the second lens holder is provided with a protruding part that protrudes toward the other of the guide bearing parts, and the other of the guide bearing parts of the first lens holder and the second lens holder is provided with a recessed part that avoids interference with the protruding part.

9. A camera module in which the lens actuating device of claim 1 is used.

10. The camera module as set forth in claim 9, comprising a bent optical system of which an optical axis is bent by 90 degrees by an optical path converting element.

11. Portable electronic equipment in which the camera module of claim 9 is used.

12. Portable electronic equipment comprising the camera module of claim 10, and a casing for housing the camera module, wherein the camera module is placed in the casing such that a longitudinal direction of the camera module coincides with a direction generally perpendicular to a longitudinal direction of the casing and that orientation of the camera module toward a subject coincides with a direction of thickness of the casing.

13. A camera module in which the lens actuating device of claim 8 is used.

14. The camera module as set forth in claim 13, comprising a bent optical system of which an optical axis is bent by 90 degrees by an optical path converting element.

15. Portable electronic equipment in which the camera module of claim 13 is used.

16. Portable electronic equipment comprising the camera module of claim 14, and a casing for housing the camera module, wherein the camera module is placed in the casing such that a longitudinal direction of the camera module coincides with a direction generally perpendicular to a longitudinal direction of the casing and that orientation of the camera module toward a subject coincides with a direction of thickness of the casing.

* * * * *